US006994506B2

(12) United States Patent
de Baan

(10) Patent No.: US 6,994,506 B2
(45) Date of Patent: Feb. 7, 2006

(54) TRANSFER ASSEMBLY FOR A HYDROCARBON PRODUCT

(75) Inventor: Jacob de Baan, Maassluis (NL)

(73) Assignee: Bluewater Terminal Systems N.V., (AN)

( * ) Notice: Subject to any disclaimer, the term of this patent is extended or adjusted under 35 U.S.C. 154(b) by 177 days.

(21) Appl. No.: 10/276,650

(22) PCT Filed: May 16, 2001

(86) PCT No.: PCT/NL01/00368

§ 371 (c)(1),
(2), (4) Date: May 13, 2003

(87) PCT Pub. No.: WO01/87703

PCT Pub. Date: Nov. 22, 2001

(65) Prior Publication Data

US 2003/0172991 A1 Sep. 18, 2003

(30) Foreign Application Priority Data

May 16, 2000 (NL) .................................... 1015208

(51) Int. Cl.

| | |
|---|---|
| ***B63B 27/00*** | (2006.01) |
| ***B63B 35/00*** | (2006.01) |
| ***B65G 67/60*** | (2006.01) |
| ***A62C 35/00*** | (2006.01) |
| ***B65H 75/34*** | (2006.01) |

(52) U.S. Cl. ............................... 414/139.4; 414/140.3; 137/355.24; 141/388

(58) Field of Classification Search ............ 414/139.4, 414/139.6, 140.3, 140.4; 141/387, 388; 137/355.24, 137/355.26, 355.19, 615, 355.36
See application file for complete search history.

(56) References Cited

U.S. PATENT DOCUMENTS

| | | | | |
|---|---|---|---|---|
| 3,980,037 A * | 9/1976 | Tuson | ........................ | 141/388 |
| 4,135,543 A * | 1/1979 | DeGraaf | ...................... | 137/615 |
| 4,190,090 A * | 2/1980 | Tuson | ........................ | 137/615 |
| 4,786,266 A * | 11/1988 | Fozard et al. | ............... | 137/615 |
| 6,089,022 A * | 7/2000 | Zednik et al. | ............. | 60/641.7 |

FOREIGN PATENT DOCUMENTS

| | | |
|---|---|---|
| DE | 2916489 | 11/1980 |
| FR | 2260490 | 9/1975 |
| GB | 2295372 | 5/1996 |
| JP | 58-097584 | 6/1983 |
| NL | 7711419 | 4/1978 |
| WO | 99/35031 | 7/1999 |

* cited by examiner

*Primary Examiner*—Gene O. Crawford

(57) ABSTRACT

To increase the safety of a transfer assembly for hydrocarbon products, particularly liquefied natural gas from a production site to a transport vessel (8) (such as a shuttle tanker), the invention proposes to provide the production site with an outrigger structure (10) with at the distant end thereof a compacted length of a flexible product transfer hose (20).

7 Claims, 1 Drawing Sheet

TRANSFER ASSEMBLY FOR A HYDROCARBON PRODUCT

Figure 1:
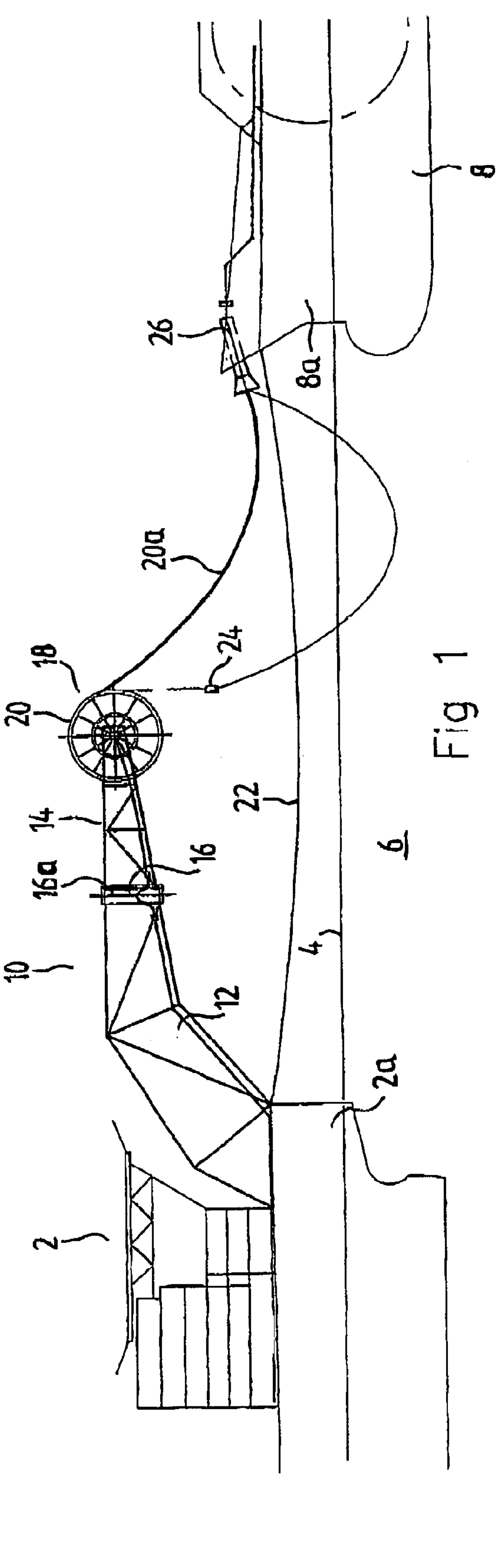

The invention relates to a transfer assembly for transferring a hydrocarbon product, particularly a liquefied natural gas from a production site to a transporting vessel (such as a shuttle tanker).

The transfer of hydrocarbon products, particularly liquefied natural gas from a production site to a vessel, such as a shuttle tanker is an undertaking which entails many risks. Known is a system commonly called the "tandem loading"-system, in which the tanker moors as close as possible, and parallel to the production site after which the transfer of the product is undertaken. Not only the shuttle tankers themselves, carrying the product, constitute a serious hazard but it is clear that a collision between a shuttle tanker and a production site during transfer side could easily have catastrophic consequences.

The invention aims to provide a transfer assembly of the kind as referred to herein before, with which it is possible to provide the largest practical separation between the production site (or a production vessel) and a shuttle tanker, which allows the use of the common double walled piping between the production site and the shuttle vessel and which minimizes the risk of gas clouds and vapors which might escape due to failures in the mechanical off-loading components.

By means of these measures a maximum distance between the production site and the transporting vessel can be maintained, so that a maximum safety is ensured. When not in use the flexible hose is stored on the reel on the end of the outrigger structure; when product is to be transferred the transfer vessel approaches the outrigger, accepts (for instance by means of a messenger line) the hose end and connects it to a receptacle on the stern of the transfer vessel. The transfer vessel can than, if necessary, increase the distance to the production side, staying connected to it by means of a common hawser.

It is observed that an outrigger structure for supporting a transfer hose, and provided at a production site is known in itself from WO-A-99/35031, FR-A-2660490 and NL-A-7711419. Providing a compacted length of hose as a reel structure on the stern of a vessel is known from GB-A-2295372. DE 29 16 489 describes a system for preventing pollution of sea water by oil from a damaged tanker in which a length of thin-walled hose is accommodated on a reel; in case of damage of a compartment wall the contents of this compartment can be transfered by a pumping assembly to the lumen of the hose which is unwound from the reel and therafter floated on the surface of the surrounding water to prevent pollution thereof.

The compacted length of hose is preferably stored on a reel.

This allows the transfer vessel to "weathervane" over a certain angle with respect to the production side, the transfer hose staying aligned with the movable outer end of the transfer arm.

The invention will be elucidated on the hand of the drawing. Herein show:

FIG. 1 a side view of the transfer assembly according to the invention; and

Figure 2:
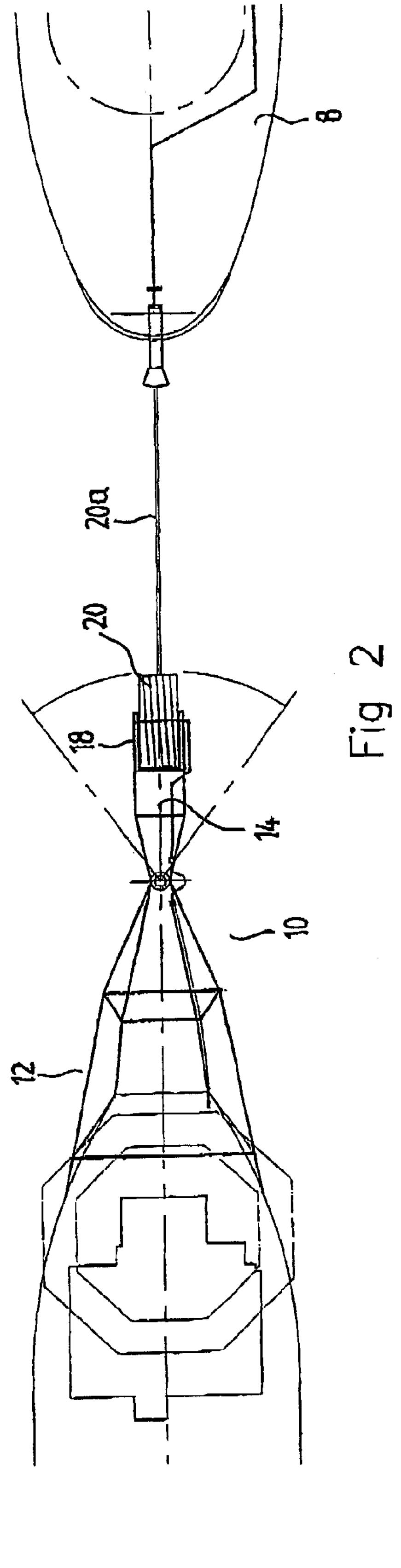

FIG. 2 a top view thereof.

FIG. 1 shows schematically a part of a hydrocarbon production site 2, in this case a production vessel, floating on the surface 4 of a body of water 6. The drawing also shows a shuttle tanker 8, floating on this body of water.

The transfer assembly according to the invention, provided on the production vessel 2 comprises an outrigger structure 10, being, in fact, an outrigger arm consisting of two parts, a first part 12, rigidly connected to one end 2*a* of the production vessel 2, and a second arm part 14 connected to the part 12 by means of a vertical hinge structure 16. The movable arm carries at its outer end a hose reel 18 on which is wound a length of flexible hose 20. This hose can be the conventional double walled piping, allowing the transfer of gaseous products and liquefied natural gas.

To be put into use the shuttle tanker 8 approaches the production vessel 2, whereafter a normal mooring hawser 22 is connected between the end 2*a* of the production vessel 2 and the bow 8*a* of the tanker 8. Thereafter a messenger line 24 is connected between the end of the hose 20 and the vessel end 2*a* and is then taken in and connected to the connectingpoint 26 on the bow 8*a* of the tanker 8. Thereafter sufficient length of hose, schematically indicated with 20*a*, is paid out and the transfer of the hydrocarbon products from the production site 2 to the tanker 8 is commenced.

The arrangement works satisfactory without the vertical hinge 16 between the two arm parts 12 and 14, thus with an entirely rigid arm, but the presence of this hinge 16 has the advantage that the hose part 20*a* and the center line of the tanker 8 will always stay aligned with the center line of the arm part 14, thus preventing bending moments on the hose 20 there where it enters the reel 18. Damping means (not shown) may be provided between the two arm ends 12 and 14. Preferably the vertical axis 16*a* of this vertical hinge 16 includes a small angle with the vertical, so that the weight on the reel arrangement 18 will stabilize the arm part 14 along the center line of the arm part 12, and thus along the center line of the production vessel.

What is claimed is:

1. A transfer assembly for transferring a hydrocarbon product from a production site to a transporting vessel, the transfer assembly comprising:

an outrigger structure mounted on the production site above the water line, and covering between 30% and 60% of a described safety distance between the production site and the vessel; and a compacted length of a flexible product transfer hose at a distant end of the transfer assembly, wherein an input end of the transfer hose is operable to be connected to a product delivery point, and wherein an outlet end of the transfer hose is operable to be connected to an inlet connection on the transporting vessel wherein the outrigger structure comprises an arm, divided by at least one hinge with a generally vertical pivot axis into at least two parts, of which at least an outer one is free to move over a pre-defined angle with respect to the longitudinal axis of the arm structure.

2. The transfer assembly according to claim 1, wherein the hinge axis is inclined over a small angle in the direction of the free end of the arm.

3. The transfer assembly according to claim 1, wherein the hydrocarbon product is a liquefied natural gas.

4. The transfer assembly according to claim 1, wherein the transporting vessel is a shuttle tanker.

5. The transfer assembly according to claim 1, wherein the compacted length of hose is stored on a hose reel.

6. The transfer assembly according to claim 5, wherein the outrigger structure comprises an arm, divided by at least one hinge with generally vertical pivot axis into at least two parts, of which at least an outer one is free to move over a pre-defined angle with respect to the longitudinal axis of the arm structure.

7. The transfer assembly according to claim 6, wherein the hinge axis is inclined over a small angle in the direction of the free end of the arm.

* * * * *